(12) United States Patent
Shirai

(10) Patent No.: US 8,553,255 B2
(45) Date of Patent: Oct. 8, 2013

(54) INFORMATION PROCESSING APPARATUS, SERVERS, DATA PROCESSING METHOD, AND COMPUTER-READABLE STORAGE MEDIUM

(75) Inventor: Kenichi Shirai, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1046 days.

(21) Appl. No.: 12/397,606

(22) Filed: Mar. 4, 2009

(65) Prior Publication Data

US 2009/0225360 A1    Sep. 10, 2009

(30) Foreign Application Priority Data

Mar. 7, 2008   (JP) .................................. 2008-057360

(51) Int. Cl.
*G06F 15/00* (2006.01)
(52) U.S. Cl.
USPC ........ 358/1.15; 358/1.14; 358/1.13; 709/224; 709/203
(58) Field of Classification Search
USPC ........................... 709/224, 213, 203; 358/1.15
See application file for complete search history.

(56) References Cited

U.S. PATENT DOCUMENTS

| | | | | |
|---|---|---|---|---|
| 5,136,634 A | * | 8/1992 | Rae et al. ................. | 379/100.11 |
| 5,893,920 A | * | 4/1999 | Shaheen et al. ............... | 711/133 |
| 6,167,436 A | * | 12/2000 | Yamane et al. ............... | 709/213 |
| 6,415,331 B1 | * | 7/2002 | Ariga ............................ | 709/246 |
| 8,169,631 B2 | * | 5/2012 | Ohno .......................... | 358/1.14 |
| 2007/0027764 A1 | * | 2/2007 | Masuo ............................ | 705/14 |
| 2009/0159661 A1 | * | 6/2009 | Sanches ........................ | 235/379 |

FOREIGN PATENT DOCUMENTS

| | | |
|---|---|---|
| JP | 06-332642 A | 12/1994 |
| JP | 11-154110 A | 6/1999 |
| JP | 2001-036552 A | 2/2001 |
| JP | 2004-227499 A | 8/2004 |
| JP | 2006-072880 A | 3/2006 |

* cited by examiner

*Primary Examiner* — Steven Kau
*Assistant Examiner* — Ashish K Thomas
(74) *Attorney, Agent, or Firm* — Canon USA Inc IP Division

(57) ABSTRACT

An information processing apparatus that monitors a system in which a plurality of servers shares job information stored in the storage device, includes a determination unit configured to determine whether each server has updated the job information stored by the server in the storage device; and a deletion unit configured to, when the determination unit determines that a server has not updated the information, delete the job information stored in the storage device by the server determined to have not updated the information.

10 Claims, 11 Drawing Sheets

300 JOB MANAGEMENT TABLE

400 PRINT DEVICE INFORMATION

500 UPDATE MANAGEMENT TABLE

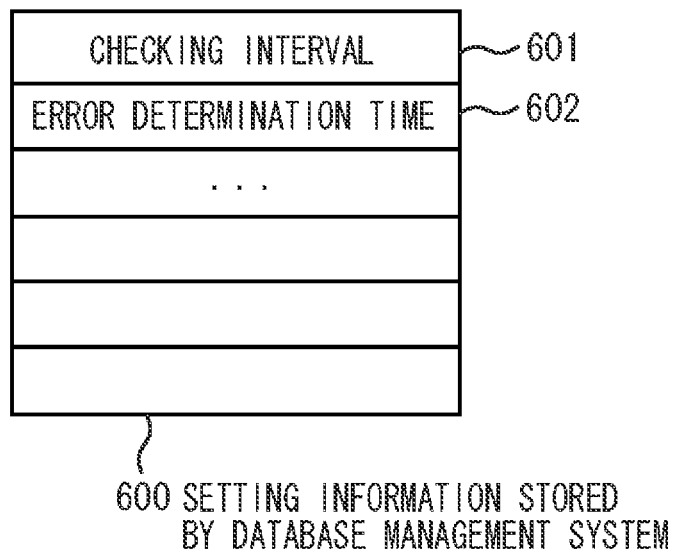
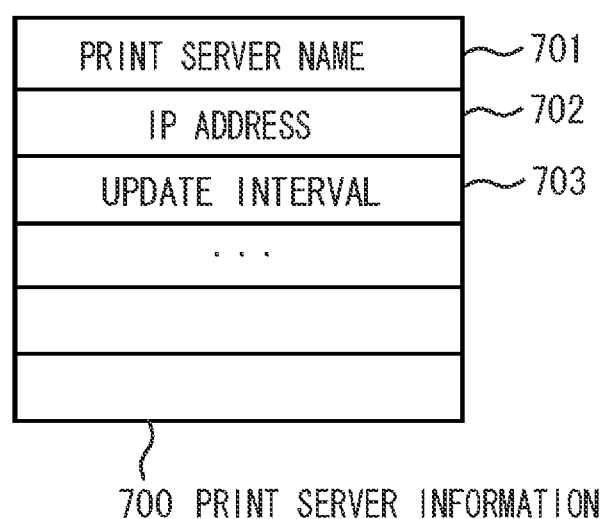

FIG. 14

| PRINTING CONDITION | | | | | |
|---|---|---|---|---|---|
| JOB NAME | JOB STATUS | SERVER | PRINTER NAME | PRINTER STATUS |
| JOB 1 | PRINTER IN PROGRESS | SERVER 1 | PRINTER 1 | NORMAL |
| JOB 2 | PRINTER IN PROGRESS | SERVER 2 | PRINTER 2 | NORMAL |
| JOB 3 | TRANSFER IN PROGRESS | SERVER 1 | PRINTER 3 | NORMAL |
| JOB 4 | ERROR | SERVER 2 | PRINTER 4 | ERROR |
| ... | ... | ... | ... | ... |

FIG. 15

| PRINTING CONDITION | | | | |
|---|---|---|---|---|
| JOB NAME | JOB STATUS | SERVER | PRINTER NAME | PRINTER STATUS |
| JOB 1 | PRINTER IN PROGRESS | SERVER 1 | PRINTER 1 | NORMAL |
| JOB 2 | ERROR | | PRINTER 2 | NORMAL |
| JOB 3 | TRANSFER IN PROGRESS | SERVER 1 | PRINTER 3 | NORMAL |
| JOB 4 | ERROR | | PRINTER 4 | ERROR |
| *** | *** | *** | *** | *** |

FIG. 16

STORAGE MEDIUM SUCH AS FD OR CD-ROM

| DIRECTORY INFORMATION |
|---|
| PROGRAM CODE CORRESPONDING TO STEPS IN FLOWCHART OF FIG. 9 |
| PROGRAM CODE CORRESPONDING TO STEPS IN FLOWCHART OF FIG. 10 |
| PROGRAM CODE CORRESPONDING TO STEPS IN FLOWCHART OF FIG. 11 |

FIG. 17

STORAGE MEDIUM SUCH AS FD OR CD-ROM

| DIRECTORY INFORMATION |
|---|
| PROGRAM CODE CORRESPONDING TO STEPS IN FLOWCHART OF FIG. 12 |
| PROGRAM CODE CORRESPONDING TO STEPS IN FLOWCHART OF FIG. 13 |

INFORMATION PROCESSING APPARATUS, SERVERS, DATA PROCESSING METHOD, AND COMPUTER-READABLE STORAGE MEDIUM

BACKGROUND OF THE INVENTION

1. Field of the Invention

The present invention relates to data processing in which servers process print job information to be stored in a storage device.

2. Description of the Related Art

Lately, an operation system tends to be formed on the server side to ensure security, establish internal control (in compliance with the SOX Act), and observe the Private Information Protection Law.

With the centralization of operation in one location, the clients managed by the servers have increased, and to cope with this situation, clustering of servers has become an effective solution.

With respect to the cluster formation in a printing system, techniques for transmitting and receiving, and spooling print jobs have been proposed.

In a clustered print system that performs monitoring of a print operation and the print device, it is assumed that job information about the same printer is stored in a plurality of servers.

With regard to a method of using a common file, Japanese Patent Application Laid-Open No. 11-154110 proposes a method for keeping track of the update of a common file and notifying the updated status to the other servers.

As described above, when common information is shared by a plurality of servers, if a failure occurs at a server, common information may not be updated. In this case, it is necessary to make sure if each individual server is alive.

As a method for confirming if a server is operational in a plurality of server environments, Japanese Patent Application Laid-Open No. 2001-036552 proposes a method for monitoring the other servers by mutually exchanging signals.

SUMMARY OF THE INVENTION

According to an aspect of the present invention, an information processing apparatus that monitors a system where a plurality of servers shares job information stored in a storage device, includes a determination unit configured to determine whether each server has updated the information stored by the server in the storage device; and a deletion unit configured to, when the determination unit determines that a server has not updated the information, delete the job information stored in the storage device by the server determined to have not updated the information.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts an example of setting information stored in the database management system illustrated in FIG. 1.

FIG. 8 depicts an example of the print server information stored in the print servers illustrated in FIG. 1.

FIG. 14 depicts an exemplary image of a user interface of the printing system according to an exemplary embodiment of the present invention.

FIG. 15 depicts an exemplary image of the user interface of the printing system according to an exemplary embodiment of the present invention.

FIG. 16 is a diagram illustrating a memory map of recording media storing various types of data processing program readable by a server according to an exemplary embodiment of the present invention.

FIG. 17 is a diagram illustrating a memory map of recording media storing various types of data processing program readable by the information processing apparatus according to an exemplary embodiment of the present invention.

DETAILED DESCRIPTION OF THE EMBODIMENTS

Embodiments of the invention will be described in detail below with reference to the drawings.

Figure 1:
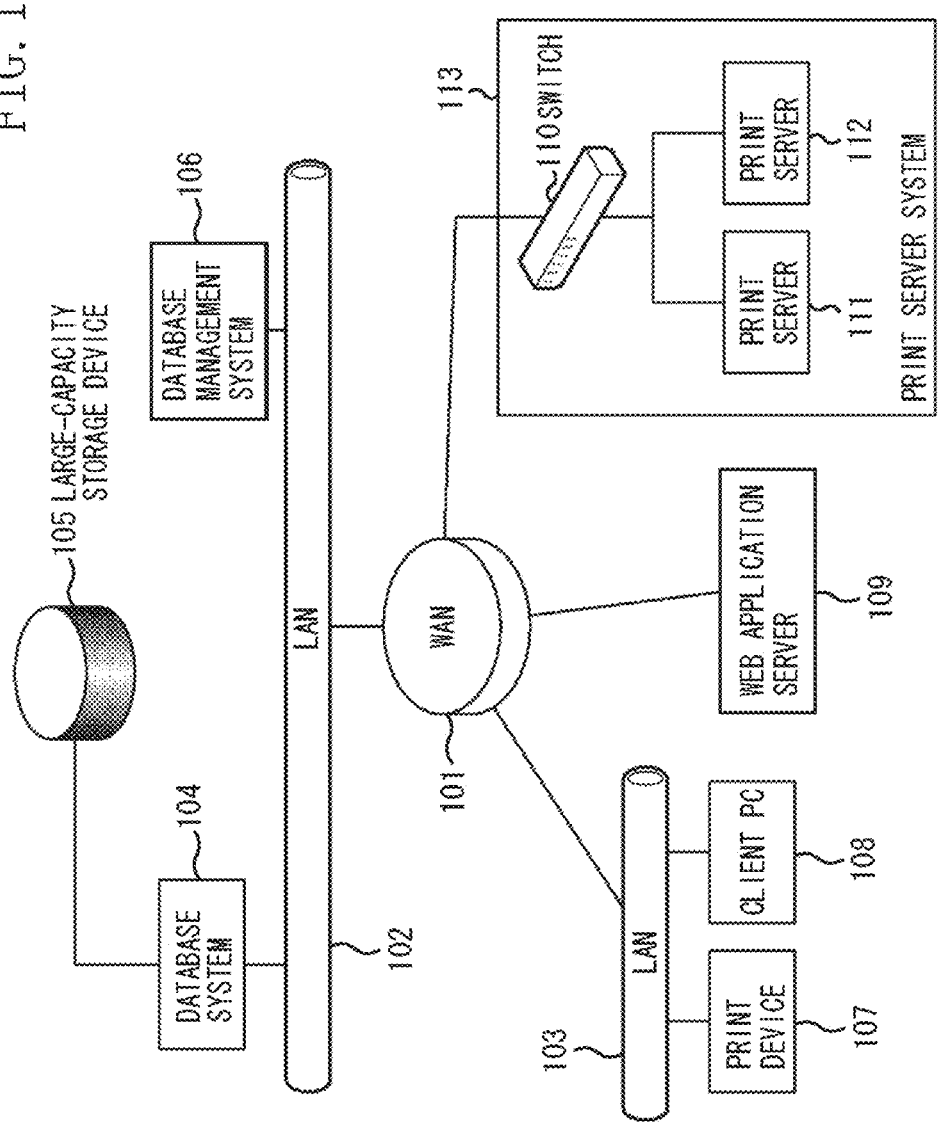
FIG. 1 is a block diagram illustrating a configuration of a printing system according to an exemplary embodiment of the present invention.

FIG. 1 is a block diagram illustrating the configuration of a printing system according to an exemplary embodiment of the present invention. In this example, a database system, a print system, a server computer, such as a web application system for example, a client computer, and a print device are interconnected via a network (wide area network (WAN)) 101.

In FIG. 1, the database system 104 manages a large-capacity storage device 105. The large-capacity storage device 105 stores print data, document data, job information, and print device information. The other systems, which will be described below, send requests to the database system 104 to access information stored in the database system. When receiving a request, the database system 104 obtains, updates, adds and deletes data.

The database system 104 may have a cluster structure for load balancing or a failover configuration to maintain high availability.

The database system 104 may be connected directly to or indirectly via a network to the large-capacity storage device 105.

A database management system 106 accesses information in the large-capacity storage device 105 via a local area network (LAN) 102 and the database system 104, and checks information about the print servers and the updated status and manages data to maintain consistency. In this exemplary embodiment, the database system 104 and the database management system 106 are each formed by a server computer.

The database management system 106 deletes information that has become unnecessary from the large-capacity storage device 105 and manages authentication information required to access the large-capacity storage device 105.

The print device 107 is an image forming device connected to a local area network (LAN) 103. The print device 107 communicates with a print server system 113 and a web application server 109, which will be described below, through the LAN 103 and the WAN 101. For the print device 107, any type of printing machine, such as a laser beam printer using electrophotographic system, or an ink jet printer using ink jet recording system, or a thermal transfer printer may be adopted.

Communication between the devices employed in this printing system may be cable communication using Ethernet (trademark) cable or wireless radio or optical communication.

Each client PC 108 is provided with hardware resources as described below, applications, including OS, and a device driver, and performs information processing suitable for the activated applications. Those client PCs 108 are connected to the LAN 103 and configured to communicate with various server systems via the WAN 101.

The web application server 109, via the WAN 101, sends print job information managed by the print server system 113 and information, such as document data, stored in the large-capacity storage device 105, to the client PCs 108.

The web application server 109 receives print commands and print job operation from client PCs 108, and issues commands to the print server system 113.

The print server system 113 monitors and manages the print device 107 in the printing system, controls and monitors print jobs, and transfers print jobs to the print device 107. The print server system 113 manages print job information in communication with the database system 104 and the web application server 109 via the WAN 101.

A large-scale system is, for balancing of load, formed in a cluster or redundant configuration is adopted. For example, as shown in FIG. 1, the print servers 111 and 112 are arranged in parallel and are configured to act as one print server system by utilizing a switch 110.

Figure 2:
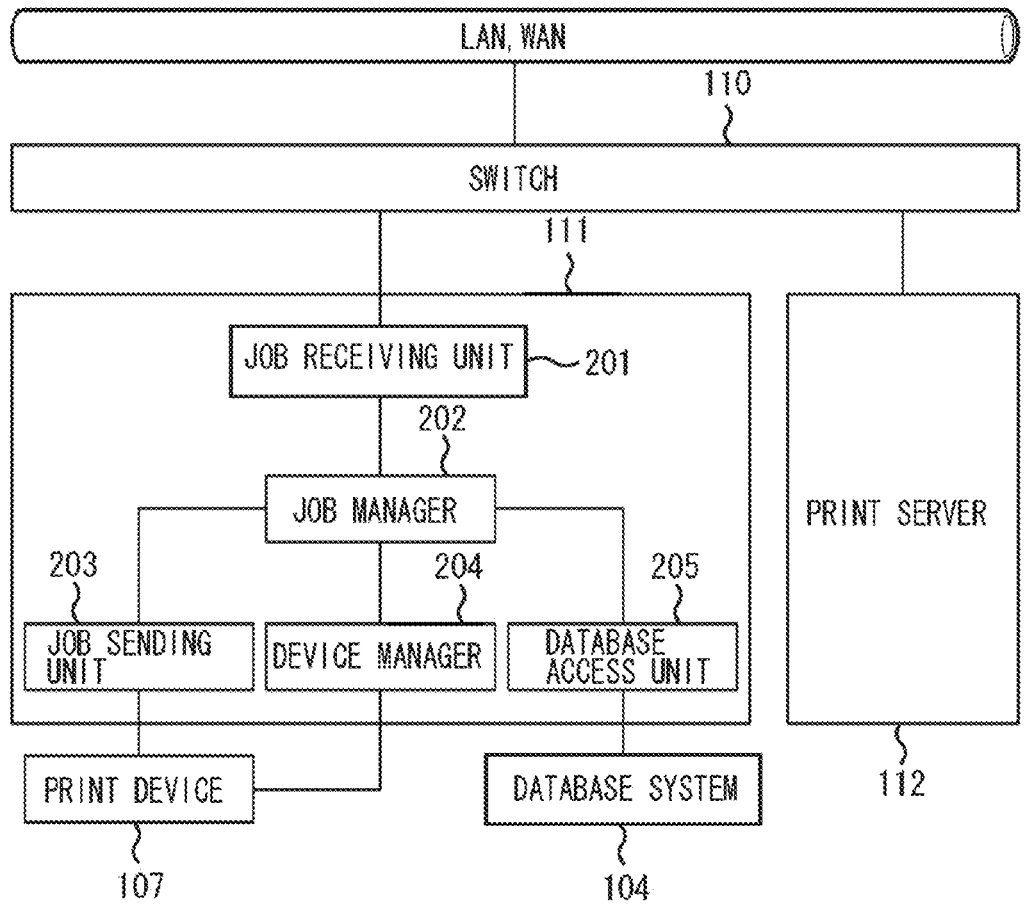
FIG. 2 is a block diagram illustrating a configuration of a print server illustrated in FIG. 1.

FIG. 2 is a block diagram illustrating the configuration of the print server system 113 shown in FIG. 1. In the present exemplary embodiment, the print server system 113 incorporates a plurality of print servers 111 and 112 connected through the switch 110 for load balancing.

In FIG. 2, the switch 110 grasps the load balancing condition among the plurality of the print servers 111 and 112, and issues and distributes a process to the server which has a light workload, in preference to the other server.

Among the methods for grasping the load balancing condition, there are a round robin method that allocates requests simply sequentially to respective print servers, and a method that issues predetermined requests periodically and determines a degree of the load based on response time. However, the method for monitoring load balancing is not limited to those examples.

Next, the internal structure of the print servers 111 and 112, and data processing executed there are described. The print server 111 in the present embodiment is described as an example, and the description about the print server 111 equally applies to the print server 112.

A job receiving unit 201, when receiving a print request from a client PC 108 through the web application server 109, obtains job information data and job data from the large-capacity storage device 105. In this case, the job receiving unit 201 of the print server 111 obtains job information data and job data from the large-capacity storage device 105 through the WAN 101, the LAN 102, and the database system 104.

A print request from the client PC 108 is made using a job ID 301 in the job management table 300 shown in FIG. 4 which will be described below. The print server 111 identifies a print job in the large-capacity storage device 105 using the job ID 301.

The job manager 202, upon receiving a print job through the job receiving unit 201, makes inquiry to the device manager 204 about the status of the print device 107, and, if the print device 107 is in normal condition, outputs a command to send a print job to the job sending unit 203.

The job manager 202, when receiving not a request to print but a request to store data, stores the print job in the database system 104 through a database access unit 205.

When receiving print job information or print device information from the device manager 204, the job manager 202 updates job information and print device information managed in the large-capacity storage device 105, through the database system 104.

Figure 3:
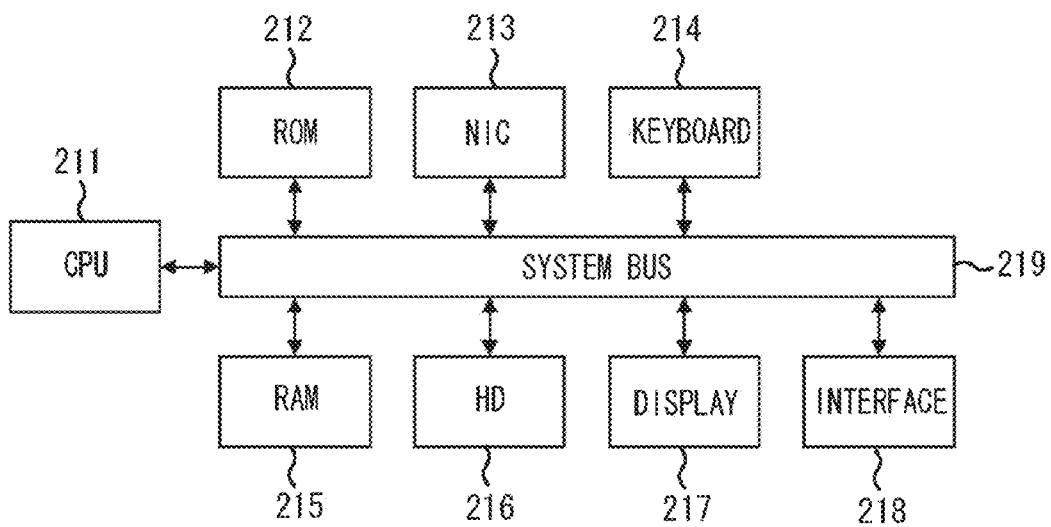
FIG. 3 is a block diagram illustrating hardware of the printing system illustrated in FIG. 1.

FIG. 3 is a block diagram for illustrating the hardware of the printing system illustrated in FIG. 1. In the printing system in FIG. 1, the database system 104, the client PC 108, the database management system 106, the web application server 109, and the print servers 111 and 112 are provided with hardware resources, which are described in the following. Note that in this exemplary embodiment, the operating system (OS) is not limited to a specific OS, but the present invention can be applied to a printing system in which various kinds of OS are installed.

In FIG. 3, a central processing unit (CPU) 211 controls the entire apparatus, and executes application programs and the OS which are loaded into a random access memory (RAM) 215 from a hard disk (HD) 216.

The CPU 211 performs control so that information, files, and so on required to execute programs are temporarily stored in the RAM 215.

A read-only memory (ROM) 212 is a non-volatile memory unit, and stores programs, such as a basic input/output (I/O) program, and various kinds of data, such as font data and template data used in document processing.

A network interface card (NIC) 213 exchanges data with external devices via an interface 218. In this data exchange, a protocol which can be used on the OS is selected to communicate with the external devices.

In a case where the database system 104 illustrated in FIG. 1 is taken as an example, the external devices correspond to the database management system 106, the client PC 108, the web application server 109, and the print servers 111 and 112.

A keyboard 214 is a command input unit. Further, as the command input unit, a pointing device may also be added. The RAM 215 is a temporary memory unit formed by a volatile memory device and is used as the main memory and the work area for the CPU 211. The RAM 215 is configured to be able to expand its memory capacity.

The HD 216 is one of the external storage devices, and functions as the large-capacity storage.

The HD 216 stores application programs, a web server program, a database program, a printer drive program, an OS, a network printer control program, and related programs.

A display 217 is a display unit which shows commands input from the keyboard 207 and the pointing device, and also indicates the status of the printer.

The interface 218 is an interface that connects to the external devices, USB devices and peripheral equipment.

A system bus 219, which is connected to the CPU 211 and the other devices, controls the flow of data between the CPU 211 and the devices.

The hardware resources in FIG. 3 are shown for purposes of example, and are not limited to those hardware resources. To cite an example, the storage units for data and programs may be changed to the ROM, RAM, and HD according to their characteristics.

Figure 4:
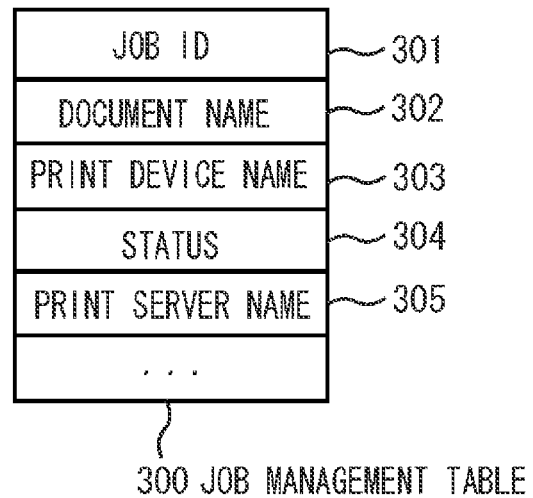
FIG. 4 depicts an example of a job management table for managing a print job, stored in the large-capacity storage device illustrated in FIG. 1.

FIG. 4 is a diagram illustrating an example of a job management table 300 used to manage print jobs stored in the large-capacity storage device 105 shown in FIG. 1.

In FIG. 4, the job ID 301 is an identifier that can uniquely identify each print job.

A document name 302 is a name to be assigned to a print job. A print device name 303 is a printer name to which a print job is transferred. A status 304 indicates a status of the print job.

The status 304 includes waiting for printing, transferring to the print device in progress, printing in progress in the print device, a printing completed status, and an error status indicating that an error has occurred in the print device.

Figure 5:
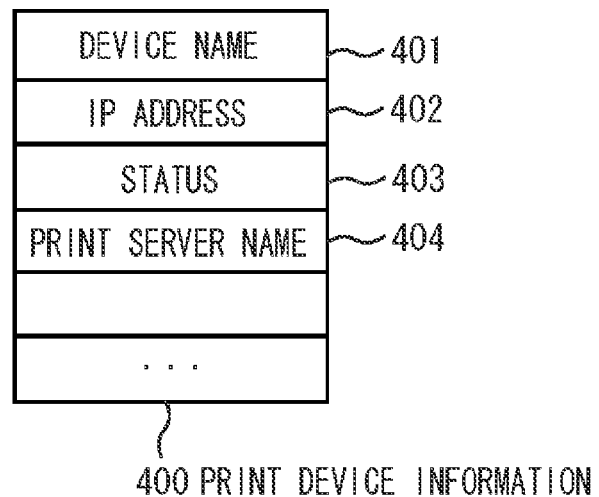
FIG. 5 depicts an example of print device information stored in the large-capacity storage device illustrated in FIG. 1.

A print server name 305 denotes a name of a print server where a print job specified by a job ID 301 is being executed FIG. 5 is a diagram illustrating an example of print device information 400 stored in the large-capacity storage device 105 illustrated in FIG. 1.

In FIG. 5, a device name 401 denotes a name to identify a type of the print device 107, and by using the device name, each of the print sevmers 111 and 112 switches the information acquisition processes.

An IP address 402 is allocated to the print device 107. The status 403 denotes information to indicate the status of the print device 107, which is obtained by the print server 111 and 112. The statuses of the print device 107 which are obtained include, besides the normal status, error status, such as paper empty, paper jam, and door open, and warning status.

The print server name 404 denotes a name of a print server to which a print job is transferred.

Figure 6:
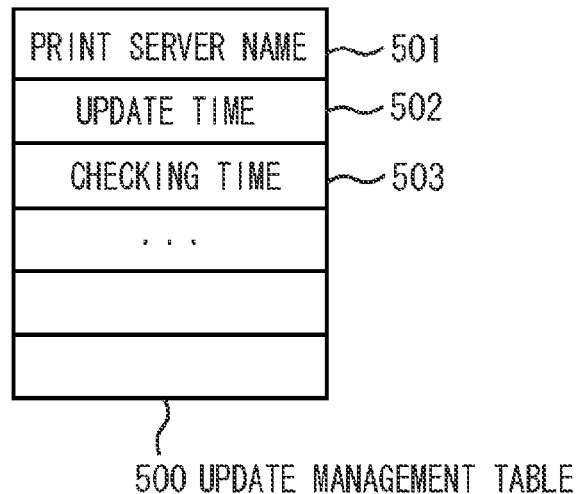
FIG. 6 depicts an example of an update management table for managing the updated status to confirm if the print server illustrated in FIG. 1 is alive.

FIG. 6 is a diagram illustrating an example of an update management table used to manage the updated status to confirm if the print server 111 and 112, illustrated in FIG. 1 is operational.

An update management table 500 resides in each of the print servers 111 and 112 and is stored in the large-capacity storage device 105 illustrated in FIG. 1. The update management table 500 stores the update time of each of the print servers 111 and 112 when the servers are updated.

In FIG. 6, a print server name 501 denotes a name of a print server that is an update management target. Update time 502 is a value periodically written by the print server after the print server is started.

Checking time 503 is a value periodically written by the database management system 106.

FIG. 7 is a diagram illustrating an example of setting information stored in the database management system 106 illustrated in FIG. 1.

In FIG. 7, setting information 600 stores a checking interval 601 and error determination time 602. The checking interval 601 denotes intervals at which the database management system 106 checks the update management table 500 illustrated in FIG. 6. When checking the update management table 500, the database management system 106 calculates a difference between update time and checking time and, if the difference is larger than a certain value, namely, a threshold value, it is determined that an error has occurred. Thus, the error determination time 602 is the threshold value used to determine the occurrence of an error. Meanwhile, the checking time 601 and the error determination time 602 are provided to enable the user to change the setting values to suit the environments of the system.

FIG. 8 is a diagram illustrating an example of print server information 700 stored in each of the print servers 111 and 112 illustrated in FIG. 1.

In FIG. 8, a print server name 701 is a unique name in the system set up in each of the print servers 111 and 112. This print server name is used as a print server name to be written in the print server names 305, 404, and 501 utilized by the print servers 111, 112 and the database management system 106.

An IP address 702 is set in the print servers 111 and 112. An update interval 703 is a value representing intervals at which each of the print servers 111 and 112 writes update time 502.

Figure 9:
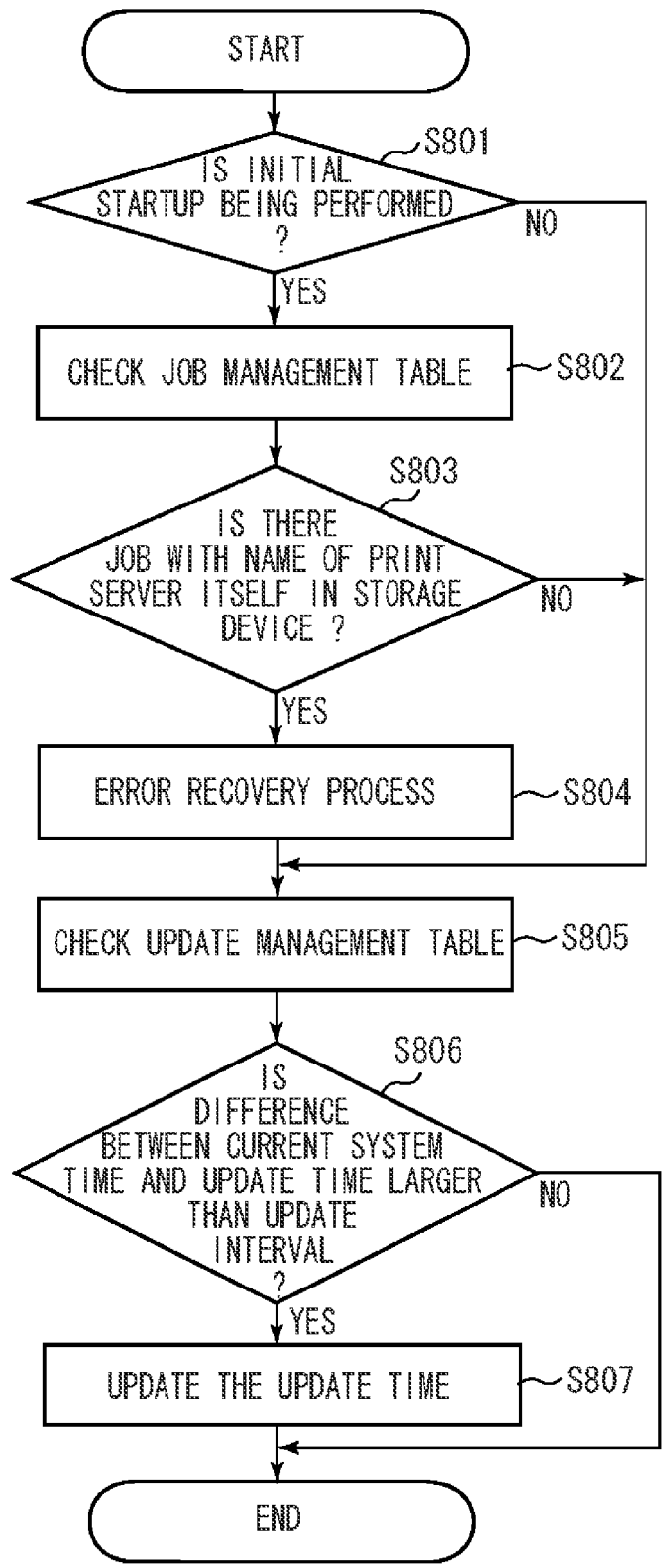
FIG. 9 depicts a flowchart illustrating an example of a data processing procedure by the print server according to an exemplary embodiment of the present invention.

FIG. 9 is a flowchart illustrating an example of a data processing procedure used by the print servers according to the exemplary embodiment. This example shows a process executed periodically after the print server 111 and 112 is started. Those steps are performed when a control program stored in the HD 216 is loaded into the RAM 215 and executed by the CPU 211 of the print server 111 and 112. For convenience of description, the print server 111 is used as an example and described.

In step S801, the CPU 211 of the print server 111 determines whether to execute an initial startup under the current status. If it is determined that an initial startup is to be performed (YES in step S801), the process advances to step S802. If it is determined that an initial startup is not performed (NO in step S801), the process goes on to step S805. Here, in the initial startup, the process in this flowchart is executed in a startup sequence that is generally carried out during a restart operation after some failure has occurred in the print server 111.

In step S802, the CPU 211 of the print server 111 checks the job management table 300 illustrated in FIG. 3. In step S803, the CPU 211 of the print server 111 searches for the jobs stored in the large-capacity storage device 105 through the database system 104 to find a job with a print server name coincident with its own print server name.

When the CPU 211 of the print server 111 determines that there is a job whose name coincides with its own print server name (YES in step S803), the process proceeds to step S804. If it is determined that there is no job whose name coincides with its own print server name (NO in step S803), the process advances to step S805.

In step S804, the CPU 211 of the print server 111 executes an error recovery process to be described below.

In step S805, the CPU 211 of the print server 111 checks print server information 700 illustrated in FIG. 8 and examines an update interval 703.

In step S806, as a result of examining the update interval 703 in step S805, the CPU 211 of the print server 111 determines whether a difference between the current system time and the update time is larger than the update interval 703. In other words, the CPU 211 of the print server 111 determines if the current system time has passed the next update time.

In step S806, if the CPU 211 of the print server 111 determines that the difference between the current system time and the update time is not larger than the update interval 703 (NO in step S806), this process is completed because it is normal. The system time here is a common time within the print server 111, and when the OS is Windows (trademark), for example, the system time refers to time that can be obtained through an interface, such as WIN32 API.

On the other hand, in step S806, if the CPU 211 of the print server 111 determines that the difference between the current system time and the update time is larger than the update interval 703 (YES in step S806), the process proceeds to step S807. In step S807, the CPU 211 of the print server 111 updates the update time in the update management table 500 to the current system time, and the process is finished.

Figure 10:
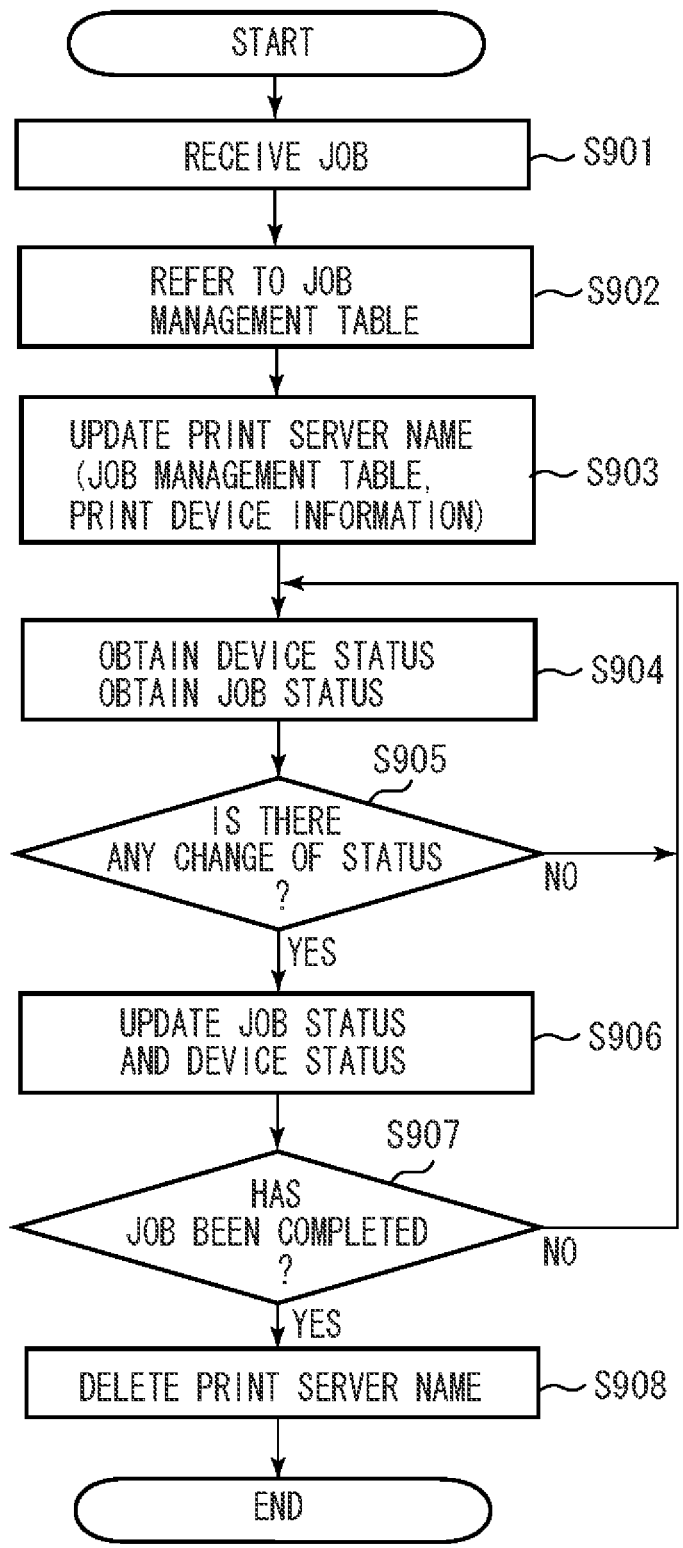
FIG. 10 depicts a flowchart illustrating an example of a data processing procedure by the print server according to an exemplary embodiment of the present invention.

FIG. 10 is a flowchart illustrating an example of a data processing procedure by the print servers according to the present exemplary embodiment. This example is a process performed when the print server 111 and 112 receives a print job. The respective steps can be realized when a control program stored in the HD 216 is loaded into the RAM 215 and executed by the CPU 211 of the print server 111 and 112. For convenience of description, the print server 111 is used as an example.

In step S901, the CPU 211 of the print server 111 receives a print job, and in step S902, the CPU 211 of the print server 111 refers to the job management table 300 and identifies job information by a job ID.

In step S903, the CPU 211 of the print server 111 updates the print server names 305 and 404 respectively in the job management table 300 of a print job identified in step S902 and in the print device information 400 of a print device as a print destination.

Then, in step S904, the CPU 211 of the print server 111 requests the print device 107 to send a job status and a device status.

In step S905, the CPU 211 of the print server 111 determines if there is any change in the status obtained in step S904. It is determined if there is any change in status by comparing information from the print device 107, the status 304 of the job management table 300 and the status 403 of the print device information 400.

When the CPU 211 of the print server 111 determines that there is some change in the job status (YES in step S905), the process proceeds to step S906. In step S906, the CPU 211 of the print server 111 updates the status in the target job management table 300. For example, if there is some change in the status of the print device, the CPU 211 updates the status 403 in the print device information 400.

On the other hand, if the CPU 211 of the print server 111 determines that there is no change in the job status in step S905 (NO in step S905), the process returns to step S904.

In step S907, the CPU 211 of the print server 111 determines if the print job status obtained in step S904 is a completion status. The completion statuses include a printing completed status, a job cancelled status, an error status, such as a failure of transfer to the print device and the like. If the job has not been completed (NO in step S907), the process returns to step S904. On the other hand, if the job has been completed (YES in step S907), the process proceeds to step S908.

In step S908, the CPU 211 of the print server 111 sets the status 304 in the job management table 300 to "completion". Further, the CPU 211 of the print server 111 deletes the print server names corresponding to the print server 111 from the job management table 300 and the print device information 400, and the process is finished.

In this exemplary embodiment, at the start of data processing, each of the print servers 111 and 112 deletes the print server name, which is used as identification information to identify itself and is registered on the job management table each time job information is processed in normal processing. This enables the print servers 111 and 112 to determine by itself whether they are normal or out of order.

Figure 11:
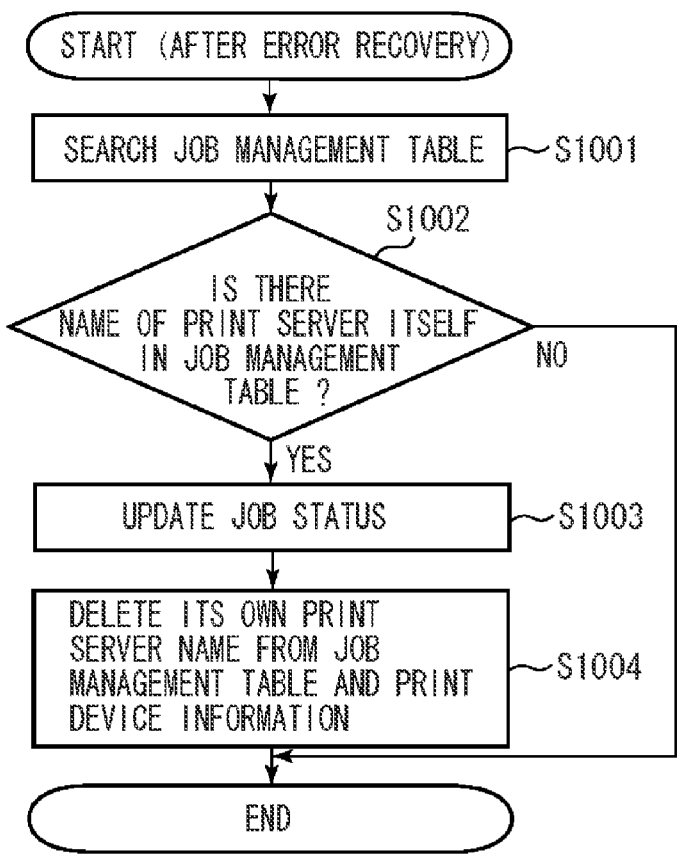
FIG. 11 depicts a flowchart illustrating an example of a data processing procedure by the print server according to an exemplary embodiment of the present invention.

FIG. 11 is a flowchart illustrating an example of a data processing procedure by the print server according to this exemplary embodiment. This example is a process executed when the print server 111 and 112 is restored from a failure. The steps of this process are realized when a control program stored in the HD 216 is loaded into the RAM 215 and executed by the CPU 211 of the print server 111 and 112. For convenience of description, the print server 111 is used as an example.

After recovery from an error, in step S1001, the CPU 211 of the print server 111 searches the job management table 300. In step S1002, the CPU 211 of the print server 111 determines whether there is a job whose name coincides with the print server name 701 in the print server information 700, among the print server names managed in the job management table 300.

If there is the print job whose name coincides with the name of the print server 111 itself (YES in step S1002), the CPU 211 of the print server 111 determines that a failure has occurred while this job was executed.

The above decision can be made because regarding the print job that has been completed, the print server name is deleted from the job management table 300 as described in FIG. 10.

As a result of the decision made in step S1002, steps S1003 and S1004 are performed for the print job whose name coincides with the print server name.

On the other hand, in step S1002, if the CPU 211 of the print server 111 determines that the relevant print job could not be found (NO in step S1002), this process is finished.

In step S1003, the CPU 211 of the print server 111 updates the status 304 in the job management table 300. There is a plurality of statuses to be updated. For example, if the status before it is updated is "PRINTING IN PROGRESS", the status is updated to "COMPLETED", if the status before update is "TRANSFER IN PROGRESS", the status is updated to "ERROR", and if the status before update is "waiting for printing", the status is updated to "UNCLEAR". The print server 111 makes update decisions.

Next, in step S1004, the CPU 211 of the print server 111 deletes the print server names from the job management table 300 and the print device information 400, and the process is finished.

In the exemplary embodiment, at the time of recovery in an error recovery process by the print server 111 and 112, the step S1002 is performed to determine whether the process status of the print server 111 and 112 is an error. This determination is made based on a fact that when data processing is completed normally, the print server name that serves as identification information for the print server 111 and 112 is deleted in step S908 in FIG. 10.

Figure 12:
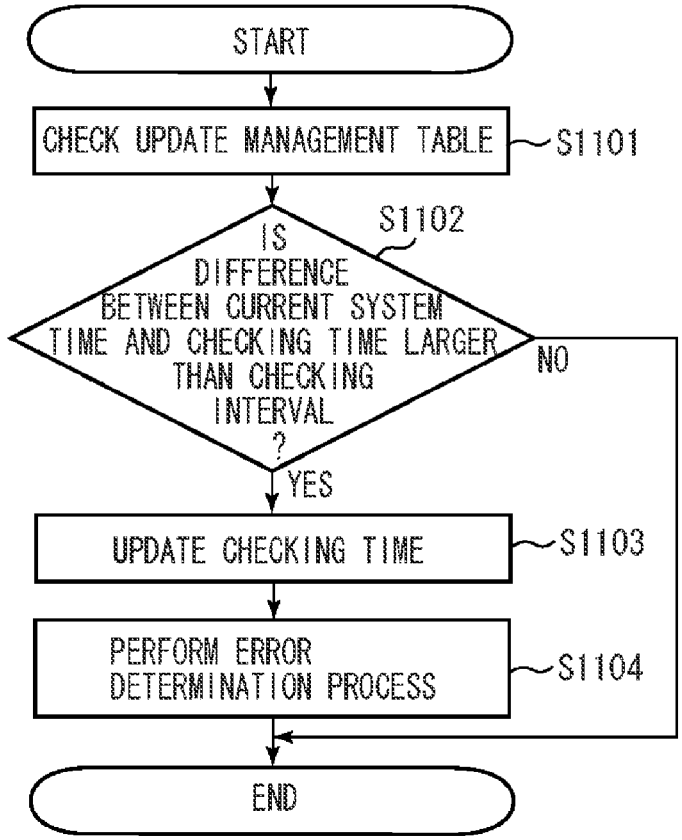
FIG. 12 depicts a flowchart illustrating an example of a data processing procedure by an information processing apparatus according to an exemplary embodiment of the present invention.

FIG. 12 is a flowchart illustrating an example of a data processing procedure by an information processing apparatus according to this exemplary embodiment. This example shows data processing in the database management system 106. The respective steps are realized when a control program stored in the HD 216 is loaded into the RAM 215 and executed by the CPU 211 of the database management system 106.

In step S1101, the CPU 211 of the database management system 106 checks checking time 503 in an update management table 500 shown in FIG. 6.

In step S1102, the CPU 211 of the database management system 106 determines whether a difference between current system time and checking time 503 in the update management table 500 is larger than a checking interval 601. In other words, the CPU 211 of the database management table 106 determines if the current system time has passed the next checking time 503.

In step 1102, if the CPU 211 of the database management system 106 determines that the difference between the current system time and the checking time 503 is not larger than the checking interval 601 (NO in step S1102), this process is finished.

On the other hand, in step S1102, if the CPU 211 of the database management system determines that the difference between the current system time and the checking time 503 is larger than the checking interval 601 (YES in step S1102), the process advances to step S1103. In step S1103, the CPU 211 of the database management system 106 updates the checking time 503 in the update management table 500 with the current system time.

Next, in step S1104, by using a difference between checking time before update and next checking time, and an error determination time 602 stored in the database management system 106, an error determination process to be described in detail below is performed, and this process is finished.

Figure 13:
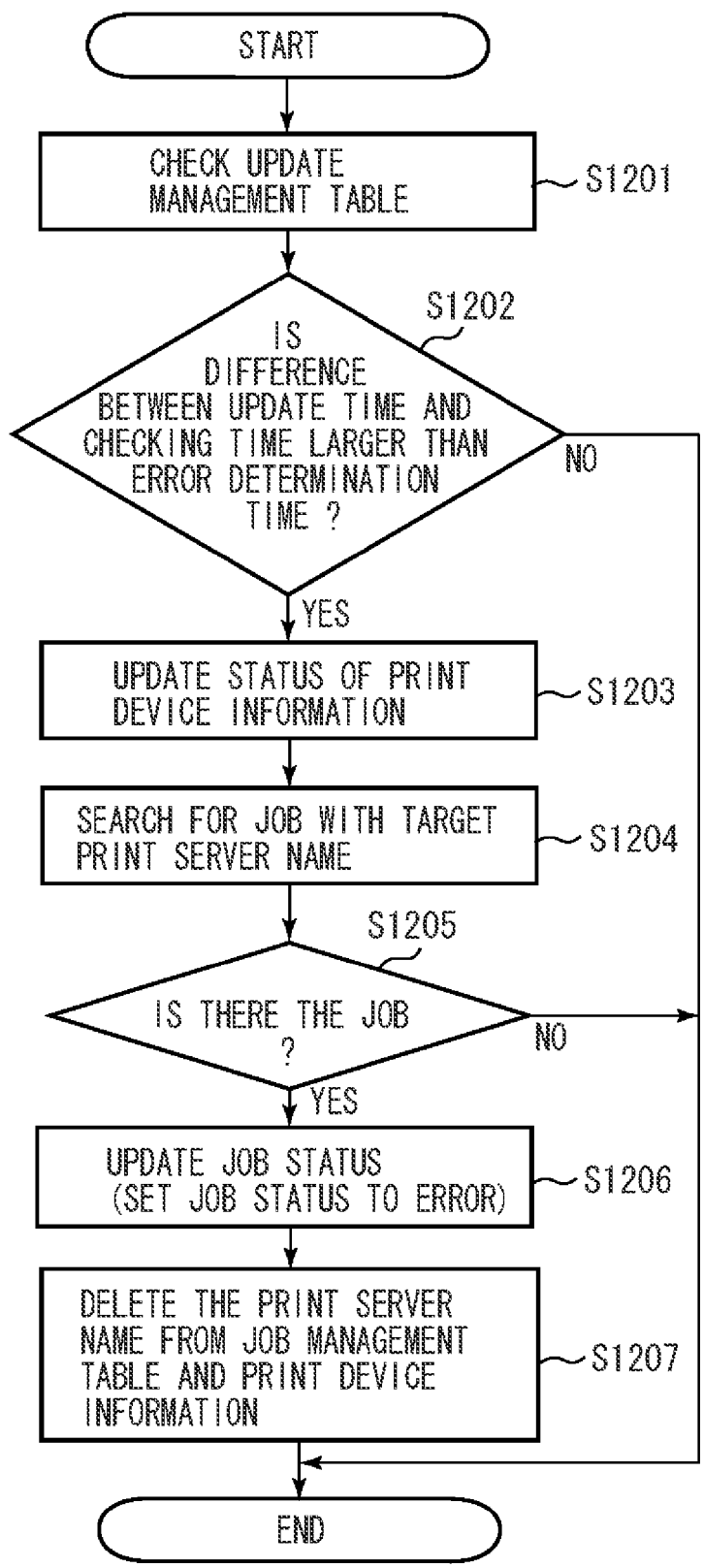
FIG. 13 depicts a flowchart illustrating an example of a data processing procedure by the information processing apparatus according to an exemplary embodiment of the present invention.

FIG. 13 is a flowchart illustrating an example of a data processing procedure carried out by the information processing apparatus according to the exemplary embodiment. This example is an error determination process by the database management system 106. The error determination process is a process carried out when the database management system 106 determines that an error has occurred in the print server. Those steps are realized when a control program stored in the HD 216 is loaded into the RAM 215 and executed by the CPU 211 of the database management system 106. For convenience of description, the error determination process for the print server 111 is used as an example, but this description also applies to the print server 112.

In step S1201, the CPU 211 of the database management system 106 checks contents of the update management table 500. Then, in step S1202, the CPU 211 of the database management system 106 compares a difference between update time and checking time, and an error determination time 602 stored in the database management system 106 as described in step S1104 in FIG. 12. In step S1202, if the CPU 211 in the database management system 106 determines that the difference between the update time and the checking time is not larger than the error determination time 602 (NO in step S1202), then the process is finished. On the other hand, in step S1202, if the CPU 211 in the database management system 106 determines that the difference between the update time and the checking time is larger than the error determination time 602, the CPU 211 determines that an error has occurred in the print server 111 (YES in step S1202), and the process advances to step S1203.

In step S1203, the CPU 211 of the database management system 106 updates the status of the print device information 400 managed by the print server that was determined to have an error.

A possible status to be updated is a "NOT CONNECTED" status, in which the print device is not monitored by any print server. Under this condition, it can be determined whether the print device is available to any other print server. In other words, by placing the print device in a status of "NOT CONNECTED", it is possible to prevent the status from staying in "ERROR".

Then, in step S1204, the CPU 211 of the database management system 106 searches the large-capacity storage device 105 for a print job carrying the print server name of the print server that was determined to have an error.

In step S1205, the CPU 211 of the database management system 106 determines if a print job carrying the print server name of the print server determined to have an error is stored in the large-capacity storage device 105. If the CPU 211 of the database management system 106 determines that there is no such job (NO in step S1205), the process ends.

On the other hand, if the CPU 211 of the database management system 106 determines that there is the job (YES in step S1205), the process advances to step S1206.

In step S1206, the CPU 211 of the database management system 106 updates the status 304 of the job management table 300 similar to step S1003. As for the statuses to be undated, if the status before it is updated is "PRINTING IN PROGRESS", the status is updated to "COMPLETED", if the status before update is "TRANSFER IN PROGRESS", the status is updated to "ERROR", and if the status before update is "waiting for printing", the status is updated to "UNCLEAR".

Then, in step S1207, the CPU 211 of the database management system 106 deletes the print server names from the job management table 300 and the print device information 400, and the process is finished.

Therefore, in a system where a plurality of severs shares the same job information and print device information, the job information and print device information can be updated surely with a less load, and data consistency among a plurality of servers can be maintained, thus enabling the servers to maintain high availability.

FIGS. 14 and 15 are diagrams showing images of the user interface of the printing system according to the exemplary embodiment. These images of the user interface are shown on the display 217 of the database management system 106 and the client PC 108 according to an operation command from the system administrator or a user who submits a print job.

In a user interface 1301 in FIG. 14, a job name 1302 is a document name of the job management table 300.

A job status 1303 denotes the status 304 of the job management table 300. A server 1304 denotes the print server name 305 of the job management table 300.

A printer name 1305 denotes the print device name 303 in the job management table 300. A printer status 1306 denotes the status 403 of the print device information 400 identified by the printer name 1305.

The system administrator or a user who submits a print job can confirm the status of the print job, printer, or print server by checking the user interface 1301 illustrated in FIG. 14 on the display 217.

For example, when the print server 111 is in normal condition, it is possible to check the status of the printer managed by the print server 111 and the status of a job submitted to the printer. In the user interface 1301, with respect to a job 4, since the printer status is "error, the job status is "error". The process of the print server 111 is performed as described in the flowchart in FIG. 10.

A user interface 1401 depicted in FIG. 15 illustrates an example of a screen when abnormality (malfunction) occurs in a server 2

In this case, the server names are not written at jobs 2 and 4; therefore, the system administrator and the user, by checking the user interface, can understand that the jobs are "error" because the servers 2 and 4 are down.

Consequently, it is possible to take proper measures, such as continuing the printing jobs on another server (server 1).

As described above, in this exemplary embodiment, the status of the printers is managed by the print server, and when the print server goes down, the database management system manages the print servers, the printers, and print jobs.

By the above processes, in a clustered printing system that monitors the print device, when the same job information is shared by a plurality of servers, it becomes possible to prevent the consistency of the whole system from being lost due to a failure in some print server.

FIG. 16 is a diagram illustrating a memory map of a recording medium (computer-readable storage medium) which stores various data processing programs readable by a server system according to this exemplary embodiment of the present invention.

FIG. 17 is a diagram illustrating a memory map of a recording medium (computer-readable storage medium) which stores various data processing programs readable by an information processing apparatus according to this exemplary embodiment of the present invention.

Though not particularly illustrated, information to manage programs can be stored in the storage medium, such as version information, creator name, and information dependent on the OS on the program reading side, such as icons to identify and display the programs.

Data used for various programs is managed by the directory of the OS. Further, a program to install programs into a computer and a program to decompress programs when they are installed can be stored in the storage medium.

The functions shown in FIGS. 9 to 13 in this exemplary embodiment may be executed by a program installed on the host computer from an external source. In this case, the present invention can be applied to a case where various items of information, including programs, are supplied to the output device from a computer-readable storage medium, such as a CD-ROM, a flash memory, or a floppy disk or from an external computer-readable storage medium through networks.

As has been described, a computer-readable storage medium that stores program code of software configured to carry out the functions of the described exemplary embodiment is supplied to a system or a device. Then, the present invention can be realized by the system or the device (or the CPU or MPU) that reads and executes the program code stored in the storage medium.

In this case, the program code itself which is read from the storage medium realizes the novel functions of the present invention, and the storage medium containing the program code constitutes the present invention.

Therefore, so long as the function of the program is included, the program may be in any form; for example, it may be object code, a program to be executed by an interpreter, or script data to be supplied to the OS.

As a computer-readable storage medium to supply the program, a floppy disk, a hard disk, an optical disk, a magneto optical disk, an MO, a compact disc-ROM (CD-ROM), a CD-recordable (CD-R), a CD-rewritable (CD-RW), a magnetic tape, a non-volatile memory card, a ROM, or a digital versatile disk (DVD) may be used.

In this case, the program code itself read from the storage medium realizes the function of the exemplary embodiment as described above, and the storage medium that stores the program code constitutes part of the present invention.

As a method for supplying the program, the user connects the browser of the client computer to the supplier's web site on the Internet. The computer program according to the exemplary embodiment of the present invention can be supplied from the web site. Alternatively, a file containing a compressed automatic install function can be downloaded to a storage medium, such as the hard disk. Otherwise, the program code that constitutes the program according to the exemplary embodiment of the present invention can be divided into a plurality of files and respective files can be downloaded from different websites. In other words, the present invention includes a WWW server and an ftp server, from which the program file that realizes by a computer the functional processing of the exemplary embodiment of the present invention is downloaded to a plurality of users.

The program of the exemplary embodiment of the present invention is encrypted and stored in a computer-readable storage medium, such as a CD-ROM, and CD-ROMs are distributed to users, and the users who meet specified requirements download key information to decipher the encrypted program from the website over the Internet. The user installs a decoded program into a computer by using the key information and realizes the invention.

The function of the described embodiment is realized not only by executing the program code that is read by the computer. For example, according to commands of the program code, the operating system (OS) running on the computer performs part of all of actual processing. By this processing, the function of the exemplary embodiment as described above is realized.

The program code read from the storage medium is written in the memory provided in a function expansion board loaded in the computer or in a function expansion unit connected to the computer. Then, according to commands of the program code, the CPU in the function expansion board or in the function expansion unit carries out part or all of actual processing, and by this processing, the function of the exemplary embodiment can also be achieved.

According to each embodiment, when job information is shared and managed by a plurality of servers, even if a failure occurs in a server, it is possible to prevent the job information managed by the servers from becoming inconsistent.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-057360 filed Mar. 3, 2007, which is hereby incorporated by reference herein in its entirety.

What is claimed is:

1. A server that controls a printing device to perform a job and shares with other servers job information containing job status information of the job performed by the printing device and being stored in a storage device, the server comprising:

a receiving unit configured to receive job information from an information processing apparatus;

a registration unit configured to, when the receiving unit receives the job information, register the server's own identification information for the job information in the storage device;

an update unit configured to acquire the job status information from the printing device and update the job status information contained in the job information stored in the storage device;

a deletion unit configured to delete the server's own identification information for the job information stored in the storage device after job information is normally completed; and a determination unit configured to, at the start of data processing, determine whether identification information for any of the job information stored in the storage device coincides with the server's own identification information, wherein when the determination unit determines that the identification information for any of the job information stored in the storage device coincides with the server's own identification information, the deletion unit deletes the identification information being stored in the storage device and being coincided with the server's own identification information.

2. The server according to claim 1, wherein at the time of recovery in an error recovery process, the determination unit determines whether the identification information stored in the storage device coincides with the server's own identification information.

3. The server according to claim 1, wherein the server shares with other servers job information containing job status information and device information containing device status information stored in the storage device.

4. An information processing apparatus that monitors a system comprising a plurality of servers according to claim 1, the apparatus comprising:

a determination unit configured to determine whether each server has updated the job information stored by the server in the storage device; and a deletion unit configured to, when the determination unit determines that a server has not updated the job information, delete the job information stored in the storage device by the server determined not to have updated the job information.

5. The information processing apparatus according to claim 4, wherein the job information includes an update time to be stored periodically in the storage device by each of the servers.

6. The information processing apparatus according to claim 5, further comprising an update management table configured to manage the update time, wherein the update management table stores the update time for each of the servers.

7. A data processing method in a server that controls a printing device to perform a job and shares with other servers job information containing job status information of the job performed by the printing device and being stored in a storage device, the method comprising:

receiving job information from an information processing apparatus;

when the job information is received, registering the server's own identification information for the job information in the storage device;

acquiring the job status information from the printing device and updating the job status information contained in the job information stored in the storage device;

deleting the server's own identification information for the job information stored in the storage device after job information is normally completed;

at the start of data processing, determining whether identification information for any of the job information stored in the storage device coincides with the server's own identification information; and when the determination unit determines that the identification information for any of the job information stored in the storage device coincides with the server's own identification information, deleting the identification information being stored in the storage device, and being coincided with the server's own identification information.

8. The data processing method according to claim 7, further comprising determining whether the identification information stored in the storage device coincides with the server's own identification information at the time of recovery from an error process.

9. A system comprising:

a server that controls a printing device to perform a job and shares with other servers job information containing job status information of the job performed by the printing device and being stored in a storage device, the server comprising:

a receiving unit configured to receive job information from an information processing apparatus;

a registration unit configured to, when the receiving unit receives the job information, register the server's own identification information for the job information in the storage device;

an update unit configured to acquire the job status information from the printing device and update the job status information contained in the job information stored in the storage device;

a deletion unit configured to delete the server's own identification information for the job information stored in the storage device after job information is normally completed; and a determination unit configured to, at the start of data processing, determine whether identification information for any of the job information stored in the storage device coincides with the server's own identification information, wherein when the determination unit determines that the identification information for any of the job information stored in the storage device coincides with the server's own identification information, the deletion unit deletes the identification information being stored in the storage device and being coincided with the server's own identification information; and an information processing apparatus that monitors the system comprising:

a determination unit configured to determine whether each server has updated the job information stored by the server in the storage device; and a deletion unit configured to, when the determination unit determines that a server has not updated the job information, delete the job information stored in the storage device by the server determined not to have updated the job information.

10. A non-transitory computer-readable storage medium containing computer-executable instructions that perform a method in a server that controls a printing device to perform a job and shares with other servers job information containing job status information of the job performed by the printing device and being stored in a storage device, the medium comprising:

computer-executable instructions that receive job information from an information processing apparatus;

computer-executable instructions that, when the job information is received, register the server's own identification information for the job information in the storage device;

computer-executable instructions that acquire the job status information from the printing device and updating the job status information contained in the job information stored in the storage device;

computer-executable instructions that delete the server's own identification information for the job information stored in the storage device after job information is normally completed;

computer-executable instructions that, at the start of data processing, determine whether identification information for any of the job information stored in the storage device coincides with the server's own identification information; and computer-executable instructions that, when the determination unit determines that the identification information for any of the job information stored in the storage device coincides with the server's own identification information, delete the identification information being stored in the storage device, and being coincided with the server's own identification information.

* * * * *